(12) United States Patent
Park et al.

(10) Patent No.: US 10,468,650 B2
(45) Date of Patent: *Nov. 5, 2019

(54) LITHIUM SULFUR BATTERY

(71) Applicant: LG CHEM, LTD., Seoul (KR)

(72) Inventors: Chang Hun Park, Daejeon (KR); Min Chul Jang, Daejeon (KR); Doo Kyung Yang, Daejeon (KR); Byong Kuk Son, Daejeon (KR); Jung Hun Choi, Daejeon (KR); Taek Gyoung Kim, Daejeon (KR); Myeong Hun Song, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/522,904

(22) PCT Filed: Oct. 19, 2015

(86) PCT No.: PCT/KR2015/010998
§ 371 (c)(1),
(2) Date: Apr. 28, 2017

(87) PCT Pub. No.: WO2016/068534
PCT Pub. Date: May 6, 2016

(65) Prior Publication Data
US 2017/0331150 A1    Nov. 16, 2017

(30) Foreign Application Priority Data

Oct. 29, 2014  (KR) .................. 10-2014-0147907
Aug. 14, 2015  (KR) .................. 10-2015-0115013

(51) Int. Cl.
*H01M 2/16* (2006.01)
*H01M 4/133* (2010.01)
(Continued)

(52) U.S. Cl.
CPC .......... *H01M 2/16* (2013.01); *H01M 2/1646* (2013.01); *H01M 2/1653* (2013.01);
(Continued)

(58) Field of Classification Search
None
See application file for complete search history.

(56) References Cited

U.S. PATENT DOCUMENTS 6,025,457 A    2/2000  Ohno et al.
9,876,211 B2 *  1/2018  Son .................. H01M 2/145
(Continued)

FOREIGN PATENT DOCUMENTS

CN    102891274 A    1/2013
CN    103647104 A    3/2014
(Continued)

OTHER PUBLICATIONS

English translation for KR 10-1338131 B1. (Year: 2013).*
(Continued)

*Primary Examiner* — Sin J Lee
(74) *Attorney, Agent, or Firm* — Birch, Stewart, Kolasch & Birch, LLP

(57) ABSTRACT

The present disclosure relates to a lithium sulfur battery, and the battery includes a cathode and an anode arranged facing each other; a separator interposed between the cathode and the anode; and an electrolyte, and further includes at least one or more membranes of a lithium ion conductive polymer membrane positioned between the cathode and the separator and having a sulfonic acid group ($-SO_3H$), and a metal oxide membrane positioned between the anode and the separator, and therefore, an electrode active material loss is reduced, an improved lifespan characteristic is obtained by blocking the spread of lithium polysulfide to the anode, and (Continued)

in addition thereto, enhanced safety is obtained by suppressing a dendrite growth in the anode.

8 Claims, 4 Drawing Sheets

(51) Int. Cl.
| | |
|---|---|
| *H01M 4/62* | (2006.01) |
| *H01M 10/42* | (2006.01) |
| *H01M 10/0567* | (2010.01) |
| *H01M 10/0566* | (2010.01) |
| *H01M 10/0565* | (2010.01) |
| *H01M 10/052* | (2010.01) |
| *H01M 4/38* | (2006.01) |

(52) U.S. Cl.
CPC ....... *H01M 2/1666* (2013.01); *H01M 2/1686* (2013.01); *H01M 4/133* (2013.01); *H01M 4/38* (2013.01); *H01M 4/382* (2013.01); *H01M 4/62* (2013.01); *H01M 4/625* (2013.01); *H01M 10/052* (2013.01); *H01M 10/0565* (2013.01); *H01M 10/0566* (2013.01); *H01M 10/0567* (2013.01); *H01M 10/42* (2013.01); *H01M 10/4235* (2013.01)

(56) References Cited

U.S. PATENT DOCUMENTS

| | | |
|---|---|---|
| 2002/0192557 A1 | 12/2002 | Choi et al. |
| 2004/0029014 A1 | 2/2004 | Hwang et al. |
| 2004/0101753 A1 | 5/2004 | Hwang |
| 2004/0209159 A1 | 10/2004 | Lee et al. |
| 2005/0003277 A1 | 1/2005 | Lee et al. |
| 2005/0136327 A1 | 6/2005 | Miyake et al. |
| 2007/0072076 A1 | 3/2007 | Kolosnitsyn et al. |
| 2013/0065127 A1 | 3/2013 | Nazar et al. |
| 2013/0149567 A1 | 6/2013 | Schaefer |
| 2013/0280637 A1* | 10/2013 | Horibe ................ H01M 4/8663 429/482 |
| 2014/0217992 A1 | 8/2014 | Li et al. |
| 2014/0220453 A1 | 8/2014 | Barchasz et al. |
| 2014/0272569 A1 | 9/2014 | Cai et al. |
| 2015/0249244 A1 | 9/2015 | Thieme et al. |
| 2016/0233475 A1 | 8/2016 | Son et al. |
| 2016/0285135 A1 | 9/2016 | Tsukahara et al. |
| 2017/0033406 A1* | 2/2017 | Zhang .................... H01M 4/38 |

FOREIGN PATENT DOCUMENTS

| | | |
|---|---|---|
| CN | 104051688 A | 9/2014 |
| EP | 3 059 784 A1 | 8/2016 |
| JP | 61-82671 A | 4/1986 |
| JP | 10-284053 A | 10/1998 |
| JP | 10-284119 A | 10/1998 |
| JP | 11-86632 A | 3/1999 |
| JP | 11-265719 A | 9/1999 |
| JP | 2004-319489 A | 11/2004 |
| JP | 2005-166536 A | 6/2005 |
| JP | 2005-251473 A | 9/2005 |
| JP | 2013-534027 A | 8/2013 |
| JP | 2014-67632 A | 4/2014 |
| JP | 2014-525654 A | 9/2014 |
| JP | WO2015/083314 A1 | 6/2015 |
| JP | 2015-531978 A | 11/2015 |
| KR | 10-0385357 B1 | 5/2003 |
| KR | 10-2004-0013585 A | 2/2004 |
| KR | 10-2004-0067030 A | 7/2004 |
| KR | 10-2005-0005352 A | 1/2005 |
| KR | 10-1297888 B1 | 8/2013 |
| KR | 10-1338131 B1 | 12/2013 |
| KR | 10-2014-0006085 A | 1/2014 |
| KR | 10-2014-0007128 A | 1/2014 |
| KR | 10-1348810 B1 | 1/2014 |
| KR | 10-2014-0064925 A | 5/2014 |
| KR | 10-2016-0051574 A | 5/2016 |
| WO | WO 2013/191790 A1 | 12/2013 |
| WO | WO 2014/041110 A1 | 3/2014 |
| WO | WO 2015/056907 A1 | 4/2015 |

OTHER PUBLICATIONS

European Search Report for Appl. No. 15855109.3 dated Feb. 22, 2018.

Agostini et al., "A Lithium-Ion Sulfur Battery Based on a Carbon-Coated Lithium-Sulfide Cathode and an Electrodeposited Silicon-Based Anode", Appl. Mater. Interfaces, 2014, vol. 6, pp. 10924-10928, see p. 10925.

International Search Report, issued in PCT/KR2015/010998, dated Feb. 5, 2016.

Tang et al., "Nation coated sulfur-carbon electrode for high performance lithium-sulfur batteries", Journal of Power Sources, 2014, vol. 246, pp. 253-259, see Abstract and p. 254.

* cited by examiner

[Fig. 1]
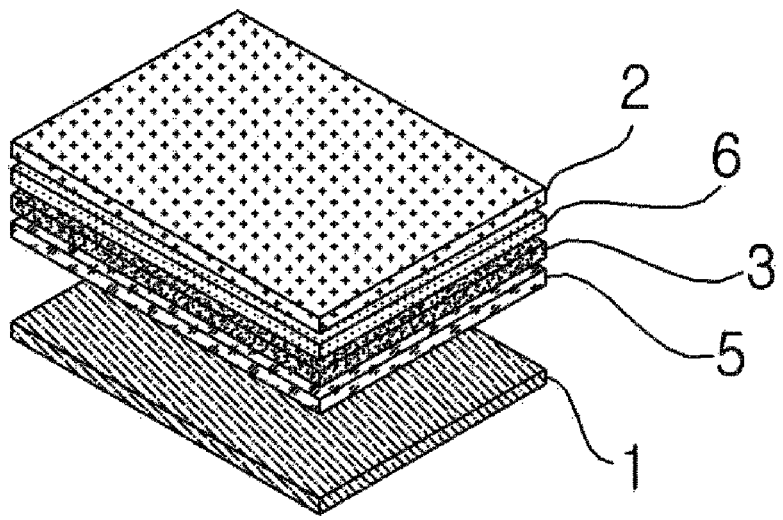
[Fig. 2]
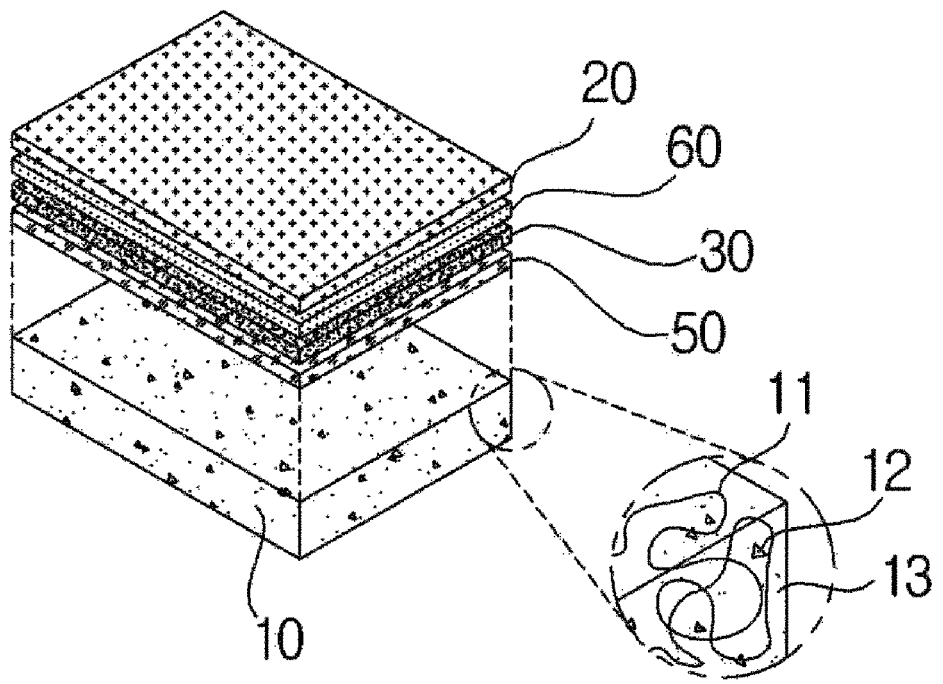

[Fig. 3]
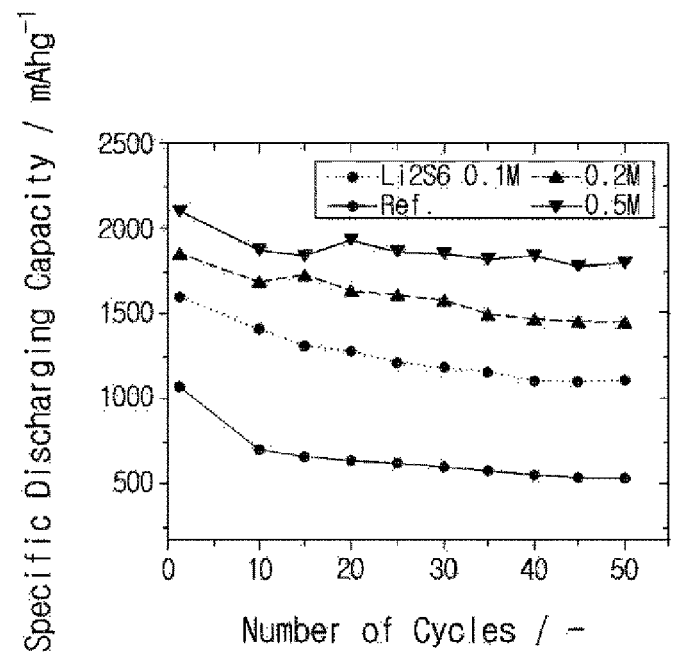
[Fig. 4]
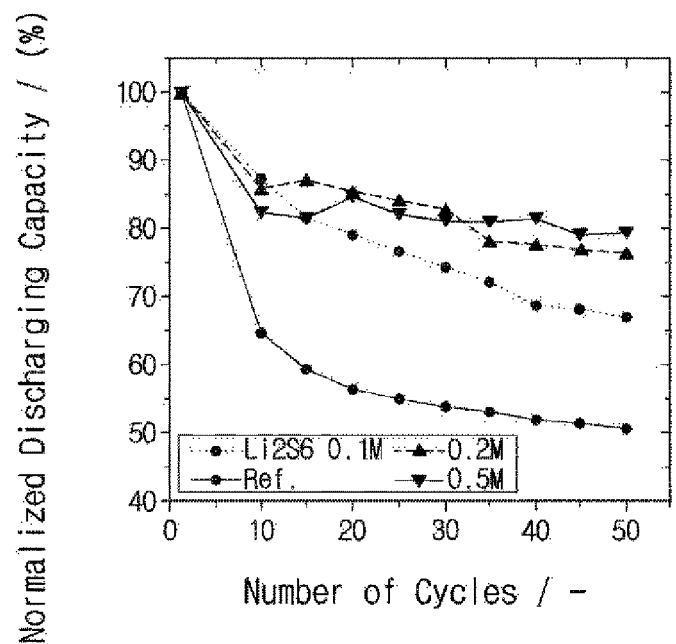

[Fig. 5]
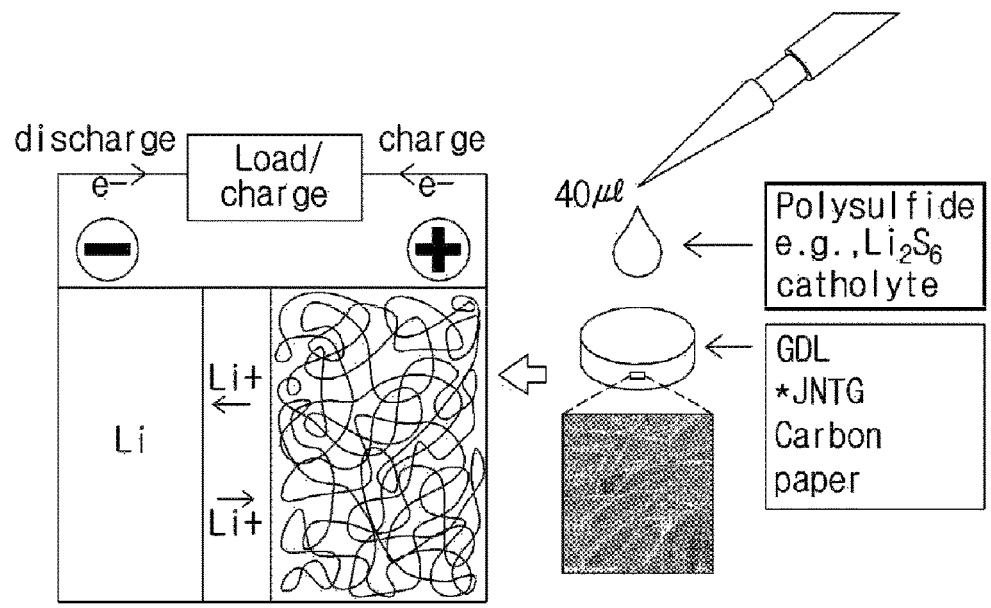
[Fig. 6]
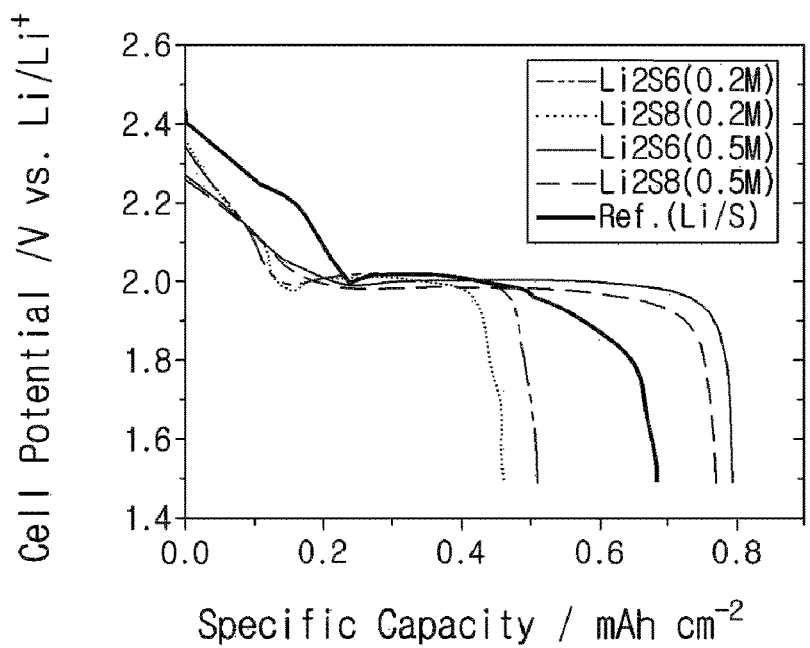

[Fig. 7]
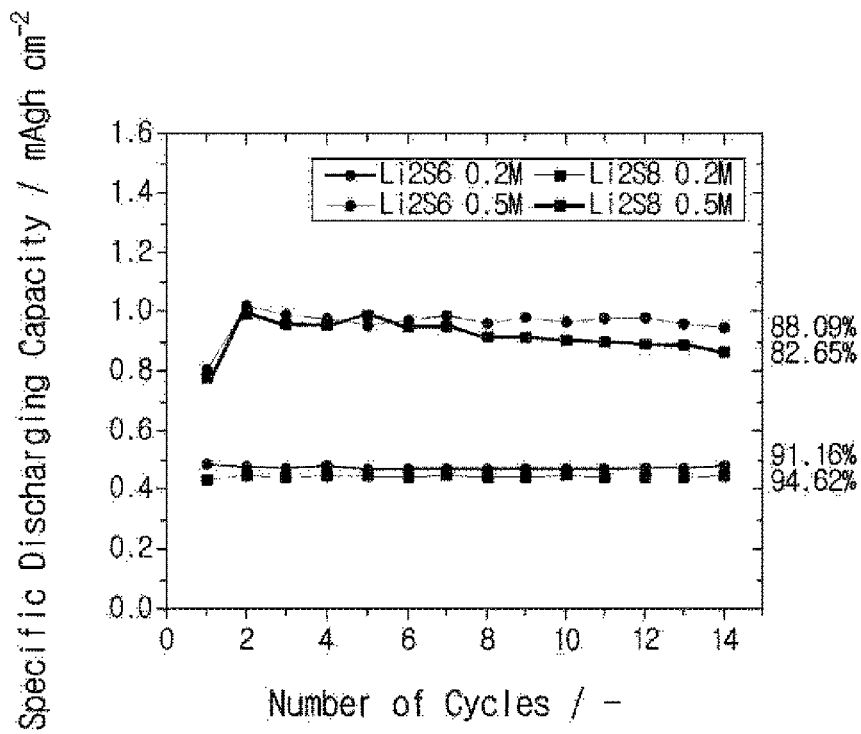

LITHIUM SULFUR BATTERY

TECHNICAL FIELD

The present disclosure relates to a lithium sulfur battery in which an electrode active material loss is reduced, an improved lifespan characteristic is obtained by blocking the spread of lithium polysulfide to an anode, and in addition thereto, enhanced safety is obtained by suppressing a dendrite growth in the anode.

BACKGROUND ART

With the advances of portable electronic devices, demands for light and high capacity batteries have increased, and as secondary batteries capable of satisfying such requirements, development of lithium-sulfur batteries using sulfur series materials as a cathode active material has been actively progressed.

Lithium-sulfur batteries are a secondary battery using sulfur series compounds having sulfur-sulfur bonds as a cathode active material, and using alkali metals such as lithium, or carbon-based materials capable of intercalation and deintercalation of metal ions such as lithium ions as an anode active material, and store and generate electric energy using an oxidation-reduction reaction reducing an oxidation number of sulfur (S) as sulfur-sulfur (S—S) bonds are broken during a reduction reaction (discharge) and forming sulfur-sulfur (S—S) bonds again as an oxidation number of sulfur (S) increases during an oxidation reaction (charge).

Specifically, an oxidation-reduction reaction of lithium and sulfur in a lithium sulfur battery may be expressed as the following reaction formulae.

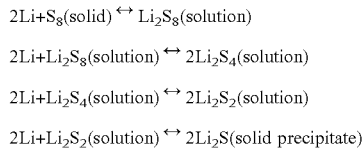

When referring to the reaction formulae, it is seen that lithium polysulfide, a new reaction product, is produced during an oxidation-reduction reaction of lithium and sulfur. Reaction capacity of sulfur capable of being used in an actual lithium sulfur battery is very low of approximately 840 mAh/g, an approximately half of theoretical capacity, due to irreversible reaction properties of some polysulfide. As a result, a lithium sulfur battery using sulfur as a cathode active material has a problem of low battery capacity.

In addition, lithium metal as an anode has an advantage of being light and having excellent energy density, but has a problem in that a cycle life characteristic is reduced due to high reactivity. In view of such a problem, researches on the formation of a protective layer capable of protecting a lithium metal surface have been recently progressed. As such a protective layer, inorganic protective layers and polymer protective layers are included, and among these, lithium phosphorus oxy-nitride (LiPON), a lithium ion conductor, has been studied representatively. However, the LiPON protective layer is formed using a sputtering method under nitrogen gas atmosphere, and when intending to form directly on a lithium metal surface, nitrogen gas and lithium metal react leading to a problem of faulting a black porous lithium complex compound having very poor binding strength on the lithium metal surface as a byproduct. In addition, when forming a polymer protective layer, a reaction sometimes occurs between a used organic solvent used when forming the protective layer and lithium metal.

Accordingly, development of materials for increasing capacity by increasing an electrochemical oxidation-reduction reaction has been required in a lithium sulfur battery.

PRIOR ART DOCUMENTS

Patent Documents

Korean Patent No. 10-0385357 (registered on 2003 May 14)

DISCLOSURE

Technical Problem

The present disclosure is directed to providing a lithium sulfur battery in which an electrode active material loss is reduced, an improved lifespan characteristic is obtained by blocking the spread of lithium polysulfide to an anode, and in addition thereto, enhanced safety is obtained by suppressing a dendrite growth in the anode.

Technical Solution

One embodiment of the present disclosure provides a lithium sulfur battery including a cathode and an anode arranged facing each other; a separator interposed between the cathode and the anode; and an electrolyte, and further including at least one or more membranes of a lithium ion conductive polymer membrane positioned between the cathode and the separator and having a sulfonic acid group (—$SO_3H$), and a metal oxide membrane positioned between the anode and the separator.

In the lithium sulfur battery, the lithium ion conductive polymer membrane having a sulfonic acid group may include one or more types of polymers selected from the group consisting of poly(perfluorosulfonic acid), poly(perfluorocarboxylic acid), a copolymer of sulfonated tetrafluoroethylene and fluoro vinyl ether, sulfonated poly arylene ether, sulfonated poly arylene ether ether ketone, sulfonated poly arylene ether ether sulfone, sulfonated polyazole, sulfonated polyvinyl alcohol, sulfonated polyphenylene oxide, sulfonated polyphenylene sulfide, sulfonated polysulfone, sulfonated polycarbonate, sulfonated polystyrene, sulfonated polyimide, sulfonated polyamide, sulfonated polyquinoxaline, sulfonated (phosphated) polyphosphazene, sulfonated polybenzimidazole and copolymers thereof.

The lithium ion conductive polymer having a sulfonic acid group may have lithium ion conductivity of $1 \times 10^{-4}$ S/cm or greater.

The lithium ion conductive polymer membrane having a sulfonic acid group may have a thickness of 0.1 μm to 10 μm.

The metal oxide membrane may include a metal oxide selected from the group consisting of colloidal silica, amorphous silica, surface-treated silica, colloidal alumina, amorphous alumina, tin oxide, titanium oxide, titanium sulfide, vanadium oxide, zirconium oxide, iron oxide, iron sulfide, iron titanate, barium titanate and mixtures thereof.

The metal oxide membrane may have a thickness of 0.1 μm to 10 μm.

The electrolyte may include supersaturated lithium polysulfide.

The cathode may include a cathode active material formed with elemental sulfur, sulfur series compounds and mixtures thereof.

The cathode may include carbon paper coated with a carbon-based conductor, and the electrolyte including lithium polysulfide may be impregnated into the carbon paper.

The cathode may include carbon paper and a conductor layer positioned on the carbon paper and including a carbon-based conductor, and the carbon paper and the conductor layer may include lithium polysulfide.

Other specifics of embodiments of the present disclosure are included in the detailed descriptions provided below.

Advantageous Effects

In a lithium sulfur battery according to the present disclosure, an electrode active material loss is reduced, an improved lifespan characteristic is obtained by blocking the spread of lithium polysulfide to an anode, and in addition thereto, enhanced safety is obtained by suppressing a dendrite growth in the anode.

DESCRIPTION OF DRAWINGS

FIG. 1 is an exploded perspective view of a lithium sulfur battery according to one embodiment of the present disclosure.

FIG. 2 is an exploded perspective view of a lithium sulfur battery according to another embodiment of the present disclosure.

FIG. 3 is a graph showing a cycle characteristic of a battery according to one embodiment of the present disclosure for each $Li_2S_6$ concentration.

FIG. 4 is a graph normalizing FIG. 3.

FIG. 5 is an overview diagram illustrating a process of voltage characteristic investigation test for each chain of $Li_2S_n$ in Test Example 4 of the present disclosure.

FIG. 6 is a graph showing cell potential depending on a battery capacity characteristic according to Test Example 4 of the present disclosure.

FIG. 7 is a graph showing a discharging capacity characteristic depending on the number of cycles of a battery according to Test Example 4 of the present disclosure.

REFERENCE NUMERAL 1, 10: Cathode
2, 20: Anode
3, 30: Separator
5, 50: Lithium Ion Conductive Polymer Membrane Having Sulfonic Acid Group
6, 60: Metal Oxide Membrane
11: Carbon Paper
12: Conductor
13: Lithium Polysulfide Solution
100, 200: Lithium Sulfur Battery

MODE FOR DISCLOSURE

Hereinafter, embodiments of the present disclosure will be described in detail with reference to the accompanying drawings so that those skilled in the art may readily implement the present disclosure. However, the present disclosure may be implemented in various different forms, and is not limited to the embodiments described herein.

Terms used in the present disclosure are used for simply describing specific embodiments, and are not intended to limit the present disclosure. Singular expressions include plural expressions unless having a clearly different meaning contextually. In the present disclosure, terms such as 'include' or 'have' are intended to designate the presence of characteristics, numbers, steps, operations, constituents, components or combinations thereof described in the specification, and it needs to be understood that the presence or addition of one or more other characteristics, numbers, steps, operations, constituents, components or combinations thereof is not excluded in advance.

When manufacturing a lithium sulfur battery in the present disclosure, a lithium ion conductive polymer membrane having a sulfonic acid terminal group is formed between a cathode and a separator to block the spread of lithium polysulfide to an anode, and as a result, a lifespan characteristic of the battery is improved, or a metal oxide membrane is formed between lithium and the separator to suppress a dendrite growth in the anode and thereby enhance safety of the battery, and in addition thereto, an electrode active material loss is prevented by using a lithium polysulfide-supersaturated electrolyte.

In other words, a lithium sulfur battery according to one embodiment of the present disclosure includes a cathode and an anode arranged facing each other; a separator interposed between the cathode and the anode; and an electrolyte, and further includes at least one or more membranes of a lithium ion conductive polymer membrane positioned between the cathode and the separator and having a sulfonic acid group ($—SO_3H$), and a metal oxide membrane positioned between the anode and the separator.

FIG. 1 is a mimetic diagram schematically illustrating a structure of a lithium sulfur battery according to one embodiment of the present disclosure. FIG. 1 is just one example for describing the present disclosure, and the present disclosure is not limited thereto.

Hereinafter, when referring to FIG. 1, the lithium sulfur battery according to one embodiment of the present disclosure includes a cathode (1) and an anode (2) arranged facing each other, a separator (3) interposed between the cathode and the anode, and an electrolyte, and selectively further includes at least one or more membranes of a lithium ion conductive polymer membrane having a sulfonic acid group ($—SO_3H$) (5) and a metal oxide membrane (6) between the cathode (1) and the separator (3), and the anode (2) and the separator (3), respectively.

In the lithium sulfur battery (100), the lithium ion conductive polymer membrane having a sulfonic acid group ($—SO_3H$) (5) includes a sulfonic acid group ($—SO_3H$) at the end of the polymer chain, and is positioned between the cathode (1) and the separator (3) blocking the spread of lithium polysulfide to the anode (2), and improves a battery lifespan characteristic.

Specifically, the lithium ion conductive polymer membrane having a sulfonic acid group ($—SO_3H$) (5) may be a sulfonated fluorine hydrocarbon-based polymer such as poly(perfluorosulfonic acid), poly(perfluorocarboxylic acid), or a copolymer of sulfonic acid group-including tetrafluoroethylene and fluoro vinyl ether; or a sulfonated non-fluorine hydrocarbon-based polymer such as sulfonated poly arylene ether (PAE), sulfonated poly arylene ether ether ketone (PAEEK), sulfonated poly arylene ether ether sulfone (PAEES), sulfonated polyazole, sulfonated polyvinyl alcohol (PVA), sulfonated polyphenylene oxide, sulfonated polyphenylene sulfide, sulfonated polysulfone, sulfonated polycarbonate, sulfonated polystyrene, sulfonated polyimide, sulfonated polyamide, sulfonated polyquinoxaline, sulfonated (phosphated) polyphosphazene or sulfonated polybenzimidazole, and in addition thereto, may be a block copolymer, a multiblock copolymer or a grafting copolymer including the polymer. The lithium ion conductive polymer may be included as one type alone or a mixture of two or more types.

In addition, the lithium ion conductive polymer having a sulfonic acid group (—$SO_3H$) may preferably have a weight average molecular weight of 90,000 g/mol to 1,000,000 g/mol. When the lithium ion conductive polymer has a weight average molecular weight of less than 90,000 g/mol or greater than 1,000,000 g/mol, effects of improvements obtained from using the lithium ion conductive polymer may be insignificant.

In addition, the lithium ion conductive polymer having a sulfonic acid group preferably has lithium ion conductivity of $1\times10^{-4}$ S/cm or greater. When the lithium ion conductivity is less than $1\times10^{-4}$ S/cm, lithium ion migration is not smooth, and effects of improvements obtained from the lithium ion conductive polymer membrane formation may be insignificant.

In addition, the lithium ion conductive polymer membrane having a sulfonic acid group (5) may preferably have a thickness of 0.1 μm to 10 μm. When the thickness is less than 0.1 μm, contact between an active material and an organic solvent is difficult to completely block. The thickness being greater than 10 μm is not preferred since lithium ion conductivity is low resulting in a high overvoltage, and battery properties decline therefrom. More preferably, the thickness is from 0.5 μm to 5 μm.

Meanwhile, the metal oxide membrane (6) is positioned between the anode (2) and the separator (3), and performs a role of enhancing battery safety by suppressing a dendrite growth in the anode (2).

Specifically, the metal oxide membrane (6) may include a metal oxide selected from the group consisting of colloidal silica, amorphous silica, surface-treated silica, colloidal alumina, amorphous alumina, tin oxide, titanium oxide, titanium sulfide ($TiS_2$), vanadium oxide, zirconium oxide ($ZrO_2$), iron oxide, iron sulfide (FeS), iron titanate ($FeTiO_3$), barium titanate ($BaTiO_3$) and mixtures thereof.

The metal oxide membrane (6) may preferably have a thickness of 0.1 μm to 10 μm. When the thickness is less than 0.1 μm or greater than 10 μm, effects of improvements obtained from the metal oxide membrane (6) formation may be insignificant.

Meanwhile, in the lithium sulfur battery (100), the cathode (1) may include, as one example, a cathode current collector and a cathode active material layer positioned on the cathode current collector and including a cathode active material and, selectively, a conductor and a binder.

As the cathode current collector, using foamed aluminum, foamed nickel and the like having excellent conductivity may be preferred.

In addition, the cathode active material layer may include elemental sulfur (S8), sulfur series compounds or mixtures thereof as the cathode active material. The sulfur series compound may specifically be $Li_2S_n$ (n≥1), an organosulfur compound, a carbon-sulfur polymer (($C_2S_x$)$_n$: x=2.5 to 50, n≥2) or the like.

The cathode active material layer may further include, together with the cathode active material, a conductor for letting electrons to smoothly migrate in the cathode (1), and a binder for increasing binding strength between the cathode active materials or between the cathode active material and the current collector.

The conductor may be a carbon-based material such as carbon black, acetylene black and ketjen black; or a conductive polymer such as polyaniline, polythiophene, polyacetylene and polypyrrole, and may be preferably included in 5% by weight to 20% by weight with respect to the total weight of the cathode active material layer. When the conductor content is less than 5% by weight, effects of enhancing conductivity obtained from the use of the conductor are insignificant, and when the content is greater than 20% by weight, the cathode active material content relatively decreases causing a concern of decline in the capacity characteristic.

As the binder, poly(vinyl acetate), polyvinyl alcohol, polyethylene oxide, polyvinyl pyrrolidone, alkylated polyethylene oxide, crosslinked polyethylene oxide, polyvinyl ether, poly(methyl methacrylate), polyvinylidene fluoride, a copolymer of polyhexafluoropropylene and polyvinylidene fluoride (product name: Kynar), poly(ethyl acrylate), polytetrafluoroethylene, polyvinyl chloride, polyacrylonitrile, polyvinylpyridine, polystyrene, and derivatives, blends and copolymers thereof, and the like, may be used. The binder may be preferably included in 5% by weight to 20% by weight with respect to the total weight of the cathode active material layer. When the binder content is less than 5% by weight, effects of improving binding strength between the cathode active materials or between the cathode active material and the current collector obtained from the use of the binder are insignificant, and when the content is greater than 20% by weight, the cathode active material content relatively decreases causing a concern of decline in the capacity characteristic.

Such a cathode (1) may be prepared using common methods, and specifically, may be prepared by coating a composition for forming a cathode active material layer prepared by mixing the cathode active material, the conductor and the binder in an organic solvent on the current collector, then drying and selectively rolling the result.

Herein, as the organic solvent, solvents capable of uniformly dispersing the cathode active material, the binder and the conductor, and readily evaporating, are preferably used. Specific examples thereof may include acetonitrile, methanol, ethanol, tetrahydrofuran, water, isopropyl alcohol and the like.

As another example of the cathode (1), the cathode (1) includes a cathode current collector; and a conducting layer positioned on the cathode current collector, and including a conductor and selectively a binder, and the cathode current collector and the conducting layer include lithium polysulfide as a liquid cathode active material.

Specifically, the cathode (1) may be prepared by preparing a cathode material by coating a mixture of the conductor and selectively the binder on the cathode current collector, and preparing an electrode assembly using the same, and adding an electrolyte including supersaturated lithium polysulfide thereto. In this case, the role of the cathode may be performed while lithium polysulfide is inserted between pores of the cathode material.

Herein, the cathode current collector and the conductor are the same as described above, and the cathode current collector is preferably carbon paper, and the conductor is preferably a carbon-based conductor such as carbon black.

FIG. 2 is a mimetic diagram schematically illustrating a structure of a lithium sulfur battery (200) including a cathode (10) having such a constitution. FIG. 2 is just one example for describing the present disclosure, and the present disclosure is not limited thereto.

Hereinafter, when referring to FIG. 2, the lithium sulfur battery (200) according to another embodiment of the present disclosure includes a cathode (10) and an anode (20) arranged facing each other, a separator (30) interposed between the cathode (10) and the anode (20), and an electrolyte, and further includes a lithium ion conductive polymer membrane (50) positioned between the cathode (10) and the separator (30) and having a sulfonic acid group (—$SO_3H$), and a metal oxide membrane (60) positioned between the anode (30) and the separator (30). Herein, the cathode (10) includes carbon paper (11) as a cathode current collector and a conductor (12) positioned on the carbon paper (11) and including a carbon-based conductor such as carbon black, and lithium polysulfide (13) is included in the carbon paper (11) and the conductor (12) as a liquid cathode active material.

As described above, by using a cathode (10) prepared by immersing an electrolyte including lithium polysulfide into carbon paper (11) coated with a conductor (12) such as carbon black instead of using a sulfur electrode as the cathode (10) as in common lithium sulfur batteries, the cathode (10) is simply and readily prepared, there are no influences of electrode constituent ratios, and deviations in the finally manufactured lithium sulfur battery (200) may be reduced due to the preparation of uniform active material composition.

Meanwhile, in the lithium sulfur battery (200), the anode (20) may include, as an anode active material, a material selected from the group consisting of materials capable of reversibly intercalating or deintercalating lithium ions, materials capable of reversibly forming lithium-containing compounds by reacting with lithium ions, lithium metal and lithium alloys.

As the material capable of reversibly intercalating or deintercalating lithium ions, any carbon-based anode active material generally used in lithium sulfur batteries as a carbon material may be used, and specific examples thereof may include crystalline carbon, amorphous carbon or materials using these together. In addition, typical examples of the material capable of reversibly forming lithium-containing compounds by reacting with lithium ions may include tin oxide ($SnO_2$), titanium nitrate, silicon (Si) and the like, but are not limited thereto. The alloy of lithium metal may specifically be an alloy of lithium and metals of Si, Al, Sn, Pb, Zn, Bi, In, Mg, Ga, or Cd.

The anode (20) may selectively further include a binder together with the anode active material.

The binder performs a role of pasting the anode active material, adhering the active materials to each other, adhering the active material and the current collector, and having a buffering effect for expansion and contraction of the active material, and the like. Specifically, the binder is the same as described above.

In addition, the anode (20) may further include an anode current collector for supporting an anode active layer including the anode active material and the binder.

The anode current collector may specifically be selected from the group consisting of copper, aluminum, stainless steel, titanium, silver, palladium, nickel, alloys thereof and combinations thereof. The stainless steel may be surface treated with carbon, nickel, titanium or silver, and aluminum-cadmium alloys may be used as the alloy. In addition thereto, baked carbon, non-conductive polymers of which surface is treated with a conductor, conductive polymers or the like may also be used.

In addition, the anode (30) may be lithium metal foil.

Commonly, during charging and discharging the lithium sulfur battery (200), sulfur used as the cathode active material may be converted to an inactive material and attached on the lithium anode surface. Such inactive sulfur is sulfur in a state of gone through various electrochemical or chemical reactions and not capable of participating in an electrochemical reaction of a cathode any more. However, inactive sulfur formed on the lithium anode surface may preformed a role of a protective layer of the lithium anode. As a result, the lithium metal and inactive sulfur formed on this lithium metal, for example, lithium sulfide, may also be used as the anode (30).

In addition, in the lithium sulfur battery (200), the separator (30) is a physical separator having a function of physically separating electrodes, and those commonly used as a separator in lithium sulfur batteries may be used without particular limit, and particularly, those having an excellent electrolyte moisture retention ability while having low resistance for ion migration of the electrolyte are preferred. Specifically, porous polymer films, for example, porous polymer films prepared with a polyolefin-based polymer such as an ethylene homopolymer, a propylene homopolymer, an ethylene/butene copolymer, an ethylene/hexene copolymer and an ethylene/methacrylate copolymer may be used either alone or as laminates thereof, or common porous non-woven fabrics, for example, non-woven fabrics made of high melting point glass fiber or polyethylene terephthalate fiber may be used, however, the separator is not limited thereto.

In the lithium sulfur battery (200), the electrolyte may include supersaturated lithium polysulfide. Herein, the supersaturated means a state in which a concentration of a solute dissolved in a solvent exceeds an equilibrium state value.

When the lithium polysulfide is not dissolved in the electrolyte, the sulfur simple substance becomes polysulfide from the cathode and dissolved in the electrolyte during discharge, which leads to a problem of battery capacity decrease caused from a decrease in the cathode active material.

However, when dissolving the lithium polysulfide in the electrolyte in a supersaturated state beforehand, the lithium polysulfide ($Li_2S_x$) ($1 \leq x \leq 8$) dissolved in the electrolyte is present uniformly dispersed in the electrolyte in the form of polysulfide ions ($S_x^{2-}$) such as $S_8^{2-}$, $S_6^{2-}$, $S_4^{2-}$, $S_2^{2-}$, and $S^{2-}$. As a result, the spread of the dissolved polysulfide ions from the electrode is suppressed reducing an active material loss, and, by the polysulfide ions near the electrode being involved in a discharging reaction, charge and discharge efficiency and cycle performance may be enhanced. In addition, kinetic synergy is obtained due to a solid-liquid reaction, and accordingly, high reaction activity is exhibited considering the solid surface.

The lithium polysulfide may be prepared by adding and mixing a lithium sulfur compound such as $Li_2S$ and elemental sulfur in the electrolyte.

The electrolyte further includes a non-aqueous organic solvent and a lithium salt.

Specifically, the non-aqueous organic solvent may be a polar solvent such as an aryl compound, bicyclic ether, non-cyclic carbonate, a sulfoxide compound, a lactone compound, a ketone compound, an ester compound, a sulfate compound and a sulfite compound.

More specifically, examples of the non-aqueous organic solvent may include 1,2-dimethoxyethane, 1,2-diethoxyethane, 1,2-dibutoxyethane, dioxolane (DOL), 1,4-dioxane, tetrahydrofuran, 2-methyltetrahydrofuran, dimethyl carbonate (DMC), diethyl carbonate (DEC), ethylmethyl carbonate (EMC), methylpropyel carbonate (MPC), ethylpropyl carbonate, dipropyl carbonate, butylethyl carbonate, ethyl propanoate (EP), toluene, xylene, dimethyl ether (DME), diethyl ether, triethylene glycol monomethyl ether (TEGME), diglyme, tetraglyme, hexamethylphosphorictriamide, gamma butyrolactone (GBL), acetonitrile, propionitrile, ethylene carbonate (EC), propylene carbonate (PC), N-methylpyrrolidone, 3-methyl-2-oxazolidone, acetic acid ester, butyric acid ester, propionic ester, dimethylformamide, sulfolane (SL), methyl sulfolane, dimethylacetamide, dimethyl sulfoxide, dimethyl sulfate, ethylene glycol diacetate, dimethyl sulfite, ethylene glycol sulfite or the like.

Among these, a mixed solvent of triethylene glycol monomethyl ether/dioxolane/dimethyl ether may be more preferred.

The lithium salt may be used without particular limit as long as it is a compound capable of providing lithium ions used in lithium sulfur batteries. Specific examples of the lithium salt may include $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$ (lithium bis(perfluoroethylsulfonyl)imide, BETI), $LiN(CF_3SO_2)_2$ (lithium bis(trifluoromethanesulfonyl)imide, LiTFSI), $LiN(C_aF_{2a+1}SO_2)(C_bF_{2b+1}SO_2)$ (however, a and b are a natural number, and preferably $1 \leq a \leq 20$ and $1 \leq b \leq 20$), lithium poly[4,4'-(hexafluoroisopropylidene)diphenoxy]sulfonylimide (LiPHFIPSI), LiCl, LiI, $LiB(C_2O_4)_2$ and the like, and among these, sulfonyl group-containing imide lithium compounds such as LiTFSI, BETI or LiPHFIPSI may be more preferred.

In addition, the lithium salt is preferably included in a concentration of 0.6 M to 2 M in the electrolyte. When the lithium salt concentration is less than 0.6 M, conductivity of the electrolyte decreases leading to a decline in the electrolyte performance, and when the concentration is greater than 2 M, viscosity of the electrolyte increases leading to a problem of reducing lithium ion mobility.

In addition to the electrolyte constituents, the electrolyte may further include additives that may be generally used in an electrolyte (hereinafter, referred to as 'other additives') for the purpose of enhancing a battery lifespan characteristic, suppressing a battery capacity decrease, enhancing battery discharging capacity and the like.

As described above, in the lithium sulfur batteries (100, 200) according to the present disclosure, an electrode active material loss is reduced, an improved lifespan characteristic is obtained by blocking the spread of lithium polysulfide to an anode, and in addition thereto, enhanced safety is obtained by suppressing a dendrite growth in the anode, and therefore, the lithium sulfur batteries are useful in portable devices requiring high charging rate such as mobile phones, notebook computers, digital cameras and camcorders, in the fields of electric vehicles such as hybrid electric vehicles (HEV) and plug-in hybrid electric vehicles (PHEV), and in mid-to-large size energy storage systems.

Hereinafter, the present disclosure will be described in detail with reference to examples so as for those having common knowledge in the technology field to which the present disclosure belongs to readily implement the present disclosure. However, the present disclosure may be implemented to various other forms, and the scope of the present disclosure is not limited to the examples described herein.

TEST EXAMPLE 1

Measuring Effects of Supersaturated Lithium Polysulfide

A symmetric cell having lithium metal (bulk Li: 150 μm) as a cathode, and lithium foil-copper foil (Li foil (40 μm)-Cu foil (20 μm)) as an anode was prepared, and by adding to an electrolyte while varying the lithium polysulfide content and identifying an increase in the utilization efficiency of the symmetric cell, effects of supersaturated lithium polysulfide were indirectly measured.

REFERENCE EXAMPLE 1

As the electrolyte in the symmetric cell, an electrolyte prepared by dissolving lithium bis(trifluoromethanesulfonyl)imide (LiTFSI) having a concentration of 1 M and $LiNO_3$ having a concentration of 0.1 M in an organic solvent formed with triethylene glycol monomethyl ether (TEGDME)/dioxolane (DOL)/dimethyl ether (DME) (mixed volume ratio=1/1/1) was used.

REFERENCE EXAMPLE 2

In the electrolyte of Reference Example 1, $Li_2S_6$ having a concentration of 0.05 M was further added.

REFERENCE EXAMPLE 3

In the electrolyte of Reference Example 1, $Li_2S_6$ having a concentration of 0.5 M was further added.

For the symmetric cells prepared in Reference Examples 1 to 3, a cycle of discharging from the cathode (bulk Li: 150 μm) to the anode (Li foil (40 μm)-Cu foil (20 μm)) at a C-rate of 0.1 C and DOD 10% and then charging was repeated 15 times, and capacity was identified by extracting the Li content on the copper foil with maximum charging. With the measured Li content, a residual Li amount in the anode side and residual capacity were identified. Using these values, battery utilization efficiency was calculated by the following Calculation Formula 1, and the results are shown in the following Table 1.

$$X = \left[ \frac{q_c - (q_1 - q_r)/N}{q_c} \right]$$ [Calculation Formula 1]

$q_c$: progressing Li content (DOD 10%: 1.32 mA)

$q_1$: Li content on Cu foil (40 μm: 13.2 mA)

$q_r$: Li content measured by fully stripping after cycle progressed (measured value)

N: 15 times

In addition, the content of $Li_2S$ and S depending on the $Li_2S_6$ concentration in the symmetric cells prepared in Reference Examples 2 and 3 is shown in the following Table 2.

TABLE 1

| | Electrolyte | Cyclic Efficiency | Deviation |
|---|---|---|---|
| Reference Example 1 | TEGDME/DOL/DME (1:1:1) + LiTFSI (1M) + $LiNO_3$ (0.1M) | 85.38% | 1.06% |
| Reference Example 2 | TEGDME/DOL/DME (1:1:1) + LiTFSI (1M) + $LiNO_3$ (0.1M) + $Li_2S_6$ (0.05M) | 88.1% | 0.98% |
| Reference Example 3 | TEGDME/DOL/DME (1:1:1) + LiTFSI (1M) + $LiNO_3$ (0.1M) + $Li_2S_6$ (0.5M) | 92.12% | 0.04% |

TABLE 2

| | Li$_2$S$_6$ | Content per 1 ml of Electrolyte (mg) | |
| --- | --- | --- | --- |
| | Concentration | Li$_2$S | S |
| Reference Example 2 | 0.05M | 2.2973 | 8.0165 |
| Reference Example 3 | 0.5M | 22.973 | 80.165 |

When referring to Table 1 and Table 2, it was identified that the content of Li$_2$S and S increased and battery utilization efficiency increased as the amount of the added lithium polysulfide increased. Accordingly, it can be seen that battery efficiency is expected to be more enhanced when an electrolyte includes supersaturated lithium polysulfide.

EXAMPLE 1

Manufacture of Battery

Sulfur (average particle size: 5 μm) was mixed with a conductor and a binder in acetonitrile using a ball mill to prepare a composition for forming a cathode active material layer. Herein, carbon black was used as the conductor, and polyethylene oxide (molecular weight 5,000,000 g/mol) was used as the binder, and they were mixed so that sulfur:conductor:binder was 60:20:20 in a weight ratio. The prepared composition for forming a cathode active material layer was coated on an aluminum current collector and then the result was dried to prepare a cathode (energy density of cathode: 1.0 mAh/Lm$^2$).

On the active material layer of the cathode, a lithium ion conductive polymer membrane of poly(perfluorosulfonic acid) (thickness: 0.5 μm, ion conductivity: 1×10$^{-4}$ S/cm) was formed.

In addition, a metal oxide membrane (thickness: 0.5 μm) including colloidal silica was formed on an anode of lithium metal having a thickness of 150 μm.

The prepared cathode and anode were positioned so that the lithium ion conductive polymer membrane and the metal oxide membrane faced each other, and then a porous polyethylene separator was interposed therebetween to prepare an electrode assembly, and after placing the electrode assembly inside a case, an electrolyte including lithium polysulfide was injected into the case to manufacture a lithium sulfur battery. Herein, the electrolyte including lithium polysulfide was prepared by adding dilithium sulfide (Li$_2$S) and elemental sulfur to an electrolyte prepared by dissolving lithium bis(trifluoromethanesulfonyl)imide (LiTFSI) having a concentration of 1 M in an organic solvent formed with triethylene glycol monomethyl ether (TEGDME)/dioxolane (DOL)/dimethyl ether (DME) (mixed volume ratio=1/1/1), then reacting the result for 48 hours at 90° C. using a magnetic stirrer, and synthesizing lithium polysulfide (Li$_2$S$_n$) in the electrolyte.

EXAMPLE 2

Manufacture of Battery

A lithium sulfur battery was manufactured in the same manner as in Example 1 except that the metal oxide membrane was not formed on the anode.

EXAMPLE 3

Manufacture of Battery

A lithium sulfur battery was manufactured in the same manner as in Example 1 except that the lithium ion conductive polymer membrane was not formed on the cathode.

EXAMPLE 4

Manufacture of Battery

A cathode material (porosity 82%) was prepared by dip coating carbon black on carbon paper (thickness: 142 μm, fiber diameter: 7 μm to 7.5 μm). On the cathode material, a lithium ion conductive polymer membrane of poly(perfluorosulfonic acid) (thickness: 0.5 μm, ion conductivity: 1×10$^{-4}$ S/cm) was formed.

In addition, a metal oxide membrane (thickness: 0.5 μm) including colloidal silica was formed on an anode of lithium metal having a thickness of 150 μm.

The prepared cathode and anode were positioned so that the lithium ion conductive polymer membrane and the metal oxide membrane faced each other, and then a porous polyethylene separator was interposed therebetween to prepare an electrode assembly, and the electrode assembly was placed inside a case. An electrolyte including lithium polysulfide was injected into the case to manufacture a lithium sulfur battery. Herein, the electrolyte including lithium polysulfide was prepared by adding dilithium sulfide (Li$_2$S) and elemental sulfur to an electrolyte prepared by dissolving lithium bis(trifluoromethanesulfonyl)imide (LiTFSI) having a concentration of 1 M in an organic solvent formed with triethylene glycol monomethyl ether (TEGDME)/dioxolane (DOL)/dimethyl ether (DME) (mixed volume ratio=1/1/1), then reacting the result for 48 hours at 90° C. using a magnetic stirrer, and synthesizing lithium polysulfide (Li$_2$S$_n$) in the electrolyte.

COMPARATIVE EXAMPLE 1

Manufacture of Battery

Sulfur (average particle size: 5 μm) was mixed with a conductor and a binder in acetonitrile using a ball mill to prepare a composition for forming a cathode active material layer. Herein, carbon black was used as the conductor, and polyethylene oxide (molecular weight 5,000,000 g/mol) was used as the binder, and they were mixed so that sulfur:conductor:binder was 60:20:20 in a weight ratio. The prepared composition for forming a cathode active material layer was coated on an aluminum current collector and then the result was dried to prepare a cathode (energy density of cathode: 1.0 mAh/cm$^2$).

In addition, lithium metal having a thickness of 150 μm was used as an anode.

A porous polyethylene separator was interposed between the prepared cathode and the anode to prepare an electrode assembly, and after placing the electrode assembly inside a case, an electrolyte was injected into the case to manufacture a lithium sulfur battery. Herein, as the electrolyte, an electrolyte prepared by dissolving lithium bis(trifluoromethanesulfonyl)imide (LiTFSI) having a concentration of 1 M in an organic solvent formed with triethylene glycol monomethyl ether (TEGDME)/dioxolane (DOL)/dimethyl ether (DME) (mixed volume ratio=1/1/1) was used.

TEST EXAMPLE 2

Cathode Observation

The cathode prepared in Example 4 was observed using a scanning electron microscope. The result is shown in FIG. 3 of Korean Patent Application No. 2015-0115013 (date of application: Aug. 14, 2015), the original application of the present disclosure.

As shown in FIG. 3 of Korean Patent Application No. 2015-0115013, it was identified that carbon black was present dispersed on carbon paper, and space between the carbon paper and pores in the carbon black was filled with lithium polysulfide.

TEST EXAMPLE 3

Cycle Characteristic Measurement for Each $Li_2S_6$ Concentration of Electrolyte A cycle characteristic of the lithium sulfur battery according to Example 1 for each $Li_2S_6$ concentration of the electrolyte was measured and shown in FIG. 3 and FIG. 4, and a capacity retention rate was calculated therefrom and shown in the following Table 3 (@50CYC.).

TABLE 3

| | Electrolyte | Capacity Retention Rate (@50CYC.) |
|---|---|---|
| Comparative Example 1 | TEGDME/DOL/DME (1:1:1) + LiTFSI (1M) + LiNO$_3$ (0.1M) | 51.78% |
| Example 1: Li$_2$S$_6$(0.1M) | TEGDME/DOL/DME (1:1:1) + LiTFSI (1M) + LiNO$_3$ (0.1M) + Li$_2$S$_6$ (0.1M) | 66.07% |
| Example 1: Li$_2$S$_6$(0.2M) | TEGDME/DOL/DME (1:1:1) + LiTFSI (1M) + LiNO$_3$ (0.1M) + Li$_2$S$_6$ (0.2M) | 73.37% |
| Example 1: Li$_2$S$_6$(0.5M) | TEGDME/DOL/DME (1:1:1) + LiTFSI (1M) + LiNO$_3$ (0.1M) + Li$_2$S$_6$ (0.5M) | 75.96% |

When referring to FIG. 3, FIG. 4 and Table 3, it was identified that the discharging capacity characteristic and the capacity retention rate of Example 1 were generally favorable, and the discharging capacity characteristic and the capacity retention rate were enhanced as the $Li_2S_6$ concentration of the electrolyte increased.

TEST EXAMPLE 4

Voltage Characteristic for Each Chain of $Li_2S_n$

Tests were progressed in a catholyte system having low sulfur electrode influences in order to investigate voltage characteristic for each chain of $Li_2S_n$. The test process is shown in FIG. 5 and Table 4.

When referring to FIG. 5, a cathode material (GDL) prepared by dip coating carbon black on carbon paper (thickness: 142 μm, fiber diameter: 7 μm to 7.5 μm) was used as in Example 4, lithium metal having a thickness of 150 μm was used as an anode, and after placing the cathode and the anode to face each other, a porous polyethylene separator was interposed therebetween to prepare a test cell. After that, 40 μl of polysulfide ($Li_2S_n$) catholyte was dropped on the cathode material, and voltage characteristic for each chain of $Li_2S_n$ was measured. Herein, types of the polysulfide and sulfur content (mg) of the sulfur in 40 μl of the polysulfide catholyte are shown in the following Table 4.

TABLE 4

| | Introduced S (mg) |
|---|---|
| Li$_2$S$_6$ (0.2M) | 0.688 |
| Li$_2$S$_8$ (0.2M) | 0.917 |
| Li$_2$S$_6$ (0.5M) | 1.72 |
| Li$_2$S$_8$ (0.5M) | 2.29 |
| Ref. (Li/S) | 0.986 |

*JNT-E: thickness: 142 μm, porosity 82%

Cell potential depending on the capacity characteristic for each concentration of the lithium polysulfide of the catholyte system is shown in FIG. 6, and a discharging capacity characteristic depending on the number of cycles for each concentration of the lithium polysulfide of the catholyte system is shown in FIG. 7.

When referring to FIG. 6 and FIG. 7, it was identified that the capacity characteristic and the cell potential were maintained to be high as the lithium polysulfide concentration of the electrolyte increased.

It was identified by Test Examples 3 and 4 that, when the electrolyte included supersaturated lithium polysulfide, the spread of the dissolved polysulfide ions from the electrode was suppressed reducing an active material loss, and, by the polysulfide ions near the electrode being involved in a discharging reaction, charge and discharge efficiency and cycle performance was enhanced. In addition, kinetic synergy was obtained due to a solid-liquid reaction, and accordingly, high reaction activity was exhibited considering the solid surface.

Hereinbefore, preferred embodiments of the present disclosure have been described in detail, however, the scope of a right of the present disclosure is not limited thereto, and various modifications and improvements made by those skilled in the art using basic concepts of the present disclosure defined in the attached claims also belong to the scope of a right of the present disclosure.

the present disclosure relates to a lithium sulfur battery, and the battery includes a cathode and an anode arranged facing each other; a separator interposed between the cathode and the anode; and an electrolyte, and further includes at least one or more membranes of a lithium ion conductive polymer membrane positioned between the cathode and the separator and having a sulfonic acid group (—SO$_3$H) and a metal oxide membrane positioned between the anode and the separator, and therefore, an electrode active material loss is reduced, an improved lifespan characteristic is obtained by blocking the spread of lithium polysulfide to the anode, and in addition thereto, enhanced safety is obtained by suppressing a dendrite growth in the anode.

The invention claimed is:
1. A lithium sulfur battery comprising:
   a cathode and an anode arranged facing each other;
   a separator interposed between the cathode and the anode;
   an electrolyte;
   a lithium ion conductive polymer membrane positioned between the cathode and the separator and having a sulfonic acid group (—SO$_3$H); and
   a metal oxide membrane formed directly on the anode and positioned between the anode and the separator, wherein the cathode includes carbon paper coated with a carbon-based conductor, and the electrolyte including lithium polysulfide is impregnated into the carbon paper; or the cathode includes carbon paper and a conductor layer positioned on the carbon paper and including a carbon-based conductor, and the carbon paper and the conductor layer include lithium polysulfide.

2. The lithium sulfur battery of claim 1, wherein the lithium ion conductive polymer membrane having a sulfonic acid group includes one or more types of polymers selected from the group consisting of poly(perfluorosulfonic acid), a copolymer of sulfonated tetrafluoroethylene and fluoro vinyl ether, sulfonated poly arylene ether, sulfonated poly arylene ether ether ketone, sulfonated poly arylene ether ether sulfone, sulfonated polyazole, sulfonated polyvinyl alcohol, sulfonated polyphenylene oxide, sulfonated polyphenylene sulfide, sulfonated polysulfone, sulfonated polycarbonate, sulfonated polystyrene, sulfonated polyimide, sulfonated polyamide, sulfonated polyquinoxaline, sulfonated (phosphated) polyphosphazene, sulfonated polybenzimidazole and copolymers thereof.

3. The lithium sulfur battery of claim 1, wherein the lithium ion conductive polymer having a sulfonic acid group has lithium ion conductivity of $1 \times 10^{-4}$ S/cm or greater.

4. The lithium sulfur battery of claim 1, wherein the lithium ion conductive polymer membrane having a sulfonic acid group has a thickness of 0.1 µm to 10 µm.

5. The lithium sulfur battery of claim 1, wherein the metal oxide membrane includes a metal oxide selected from the group consisting of colloidal silica, amorphous silica, surface-treated silica, colloidal alumina, amorphous alumina, tin oxide, titanium oxide, vanadium oxide, zirconium oxide, iron oxide, iron titanate, barium titanate and mixtures thereof.

6. The lithium sulfur battery of claim 1, wherein the metal oxide membrane has a thickness of 0.1 µm to 10 µm.

7. The lithium sulfur battery of claim 1, wherein the electrolyte includes supersaturated lithium polysulfide.

8. The lithium sulfur battery of claim 1, wherein the cathode includes a cathode active material formed with elemental sulfur, sulfur series compounds and mixtures thereof.

* * * * *